(12) United States Patent
Shindo et al.

(10) Patent No.: US 7,931,252 B2
(45) Date of Patent: Apr. 26, 2011

(54) STEAM VALVE

(75) Inventors: Osamu Shindo, Yokohama (JP);
Hideaki Miyayashiki, Yokohama (JP);
Atsushi Narabe, Musashino (JP);
Makoto Takahashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 54 days.

(21) Appl. No.: 12/549,640

(22) Filed: Aug. 28, 2009

(65) Prior Publication Data

US 2010/0006792 A1        Jan. 14, 2010

Related U.S. Application Data

(62) Division of application No. 11/214,064, filed on Aug. 30, 2005, now abandoned.

(30) Foreign Application Priority Data

Aug. 30, 2004    (JP) ................... 2004-250408

(51) Int. Cl.
*F16K 1/00*        (2006.01)
*F16K 15/00*       (2006.01)
(52) U.S. Cl. ........................ 251/333; 251/318
(58) Field of Classification Search .......... 251/318, 251/333, 334
See application file for complete search history.

(56) References Cited

U.S. PATENT DOCUMENTS

| 3,857,542 | A | * | 12/1974 | Heymann | ................ 251/120 |
| 4,180,240 | A | | 12/1979 | Sheldon et al. | |
| 4,688,755 | A | * | 8/1987 | Pluviose | ................ 251/121 |
| 4,735,224 | A | | 4/1988 | Pluviose | |
| 5,318,270 | A | | 6/1994 | Detanne et al. | |
| 5,603,348 | A | | 2/1997 | Geringer | |
| 7,108,244 | B2 | | 9/2006 | Hardin | |
| 7,201,188 | B2 | * | 4/2007 | Baumann | ................ 137/625.33 |

FOREIGN PATENT DOCUMENTS

| JP | 56-109955 A | 8/1981 |
| JP | 62-209275 A | 9/1987 |
| JP | 62-267504 A | 11/1987 |
| JP | 09-072430 A | 3/1997 |
| JP | 09-210244 A | 8/1997 |
| JP | 10-089494 A | 4/1998 |
| JP | 10-299909 A | 11/1998 |
| JP | 10-299910 A | 11/1998 |
| JP | 2001-193846 A | 7/2001 |
| JP | 2004-116607 A | 4/2004 |

* cited by examiner

*Primary Examiner* — John K Fristoe, Jr.
(74) *Attorney, Agent, or Firm* — Foley & Lardner LLP (57) ABSTRACT

A steam valve is provided with a valve body, a valve seat, and a valve rod provided for the valve body. The valve body has a bottom portion to which a recessed portion is formed, and the recessed portion has an edge, which is positioned on an upstream side of a place at which a shock wave is generated in steam flowing through a steam path defined by the valve body and the valve seat.

12 Claims, 10 Drawing Sheets

STEAM VALVE

CROSS REFERENCE TO RELATED APPLICATION

The present application is a divisional of U.S. Ser. No. 11/214,064, filed Aug. 30, 2005 which is based upon and claims the benefit of priority from prior Japanese Patent Application No. 2004-250408 filed on Aug. 30, 2004, the entire contents of which are incorporated herein by reference.

BACKGROUND OF THE INVENTION

1. Field of the Invention

The present invention relates to steam valves, for example, for power-generating facilities, and specifically, to a steam valve that is provided with an improved valve body to ensure and maintain a steady flow of steam passing through a gap between the valve body and a valve seat.

2. Related Art

Generally, steam turbines used in power-generating facilities, such as thermal power plants and nuclear power plants, are provided with many steam valves for controlling the amount of steam flow according to load changes, or for cutting off the supply of steam in response to an emergency.

A steam control valve, among steam valves used in thermal power plants and the like, deals with a large amount of hot and high-pressure steam flow and, therefore, frequently opens and closes its valve body. This causes steam to drift or swirl in the beginning process of opening the valve body or in the process of closing the valve body. Such steam turbulence results in noise, vibration, erosion, and accidents, such as cracks in a connecting part of a valve rod supporting the valve body.

A number of inventions have been provided to prevent such problems and accidents, such as disclosed in, for example, documents or publications of Japanese Unexamined Patent Publications Nos. SHO 56-109955, HEI 9-72430, HEI 9-210244, HEI 10-89494, HEI 10-299909, and HEI 10-299910.

In particular, Japanese Unexamined Patent Publication No. SHO 56-109955 discloses a so-called pioneering technique that was developed when noise and vibration were serious issues.

In recent power-generating facilities planning to introduce ultra-supercritical pressure technology, steam conditions (temperature and pressure) increase as the single capacity of a steam turbine increases. Such increases in steam conditions cause noise and vibration to be a major concern again.

To reduce noise and vibration, techniques that are the results of development and are disclosed in the above-described documents have been conventionally used in dealing with subcritical pressure at a pressure of 169 ata and a temperature of 538° C., and supercritical pressure at a pressure of 246 ata and a temperature of 538° C. However, initiatives to introduce ultra-supercritical pressure technology require new techniques to be developed and cause the above-described conventional techniques to reach their limits.

In particular, a common challenge for turbine producers to further reduce noise and vibration is to determine the size of the edge of the valve body such that a steady steam flow can be ensured and maintained even if the above-described steam conditions increase further.

SUMMARY OF THE INVENTION

The present invention was conceived in consideration of the above circumstances, and an object of the present invention is to provide a steam valve having an improved structure capable of ensuring a and maintaining a stable steam flow around a valve body at a time of opening or closing the valve body.

The above and other objects can be achieved according to the present invention by providing, in one aspect, a steam valve comprising:

a valve body;
a valve seat; and
a valve rod provided for the valve body, the valve body having a bottom portion to which a recessed portion is formed, the recessed portion having an edge, wherein the edge is positioned on an upstream side of a place at which a shock wave is generated in a steam flowing through a steam path defined by the valve body and the valve seat.

In this aspect, the edge is positioned at a critical point of the steam flowing through the steam path, which is defined by the valve body and the valve seat.

In preferred examples of the above aspects, a range of an edge diameter $D_i$ of the edge may be set to $$D_i \geq 0.90\, D_o$$

and a range of a valve-seat internal diameter $D_{th}$ of the valve seat is set to $$D_{th} \geq 0.80\, D_o$$

where $D_o$ is a valve seat diameter of the valve seat.

The range of an edge diameter $D_i$ of the edge may be set to $$D_i = (0.90 \text{ to } 1.0) D_o$$

and a range of a valve-seat internal diameter $D_{th}$ of the valve seat may be set to $$D_{th} = (0.80 \text{ to } 0.90) D_o$$

where $D_o$ is a valve seat diameter of the valve seat.

A depth h of the recessed portion may be set to $h \leq 15$ mm and a tilt angle $\theta$ of the edge is set to $\theta = 45°$.

The range of a curvature radius R of the valve body may be set to $$R = (0.52 \text{ to } 0.6) D_o$$

and a range of a curvature radius r of the valve seat may set to $$r \geq 0.6\, D_o$$

where $D_o$ is a valve seat diameter of the valve seat.

The range of a curvature radius R of the valve body may be set to $$R = (0.6 \text{ to } 0.85) D_o$$

and the range of a curvature radius r of the valve seat may be set to $$r = (0.45 \text{ to } 0.6) D_o$$

where $D_o$ is a valve seat diameter of the valve seat.

The range of a curvature radius R of the valve body and a curvature radius r of the valve seat may be set to $$R = r = (0.45 \text{ to } 0.85) D_o$$

where $D_o$ is a valve seat diameter of the valve seat.

The range of a maximum valve lift La of the valve body combined with the valve seat may be set to $$L_a = (0.25 \text{ to } 0.35) D_o$$

where $D_o$ is a valve seat diameter of the valve seat.

The range of a maximum valve lift Lb of the valve body separated from the valve seat may be set to $$L_b \leq 0.25\, D_o$$

where $D_o$ is a valve seat diameter of the valve seat.

In addition, the valve body, the valve seat, and the recessed portion are formed with either one of a hardened heat-treated portion and a hard-alloy-surfaced portion.

In a further aspect of the present invention, there is also provided a steam valve comprising:

a valve body;

a valve seat; and a valve rod provided for the valve body, the valve body having a bottom portion to which a recessed portion is formed, the recessed portion having an edge, wherein a groove is provided along an entire circumferential surface of the valve body.

In this aspect, the groove is formed on a downstream side of a critical point of steam flowing through a steam path defined by the valve body and the valve seat.

In a still further aspect, there is also provided a steam valve comprising:

a valve body;

a valve seat; and a valve rod provided for the valve body, the valve body having a bottom portion to which a recessed portion is formed, the recessed portion having an edge, wherein at least one of the valve body and the valve seat is provided with a knurled portion formed on a downstream side of a critical point of steam flowing through a steam path defined by the valve body and the valve seat.

In this aspect, the knurled portion may be provided along an entire circumferential surface of the valve body or valve seat.

According to the steam valve of the present invention having the improved structure mentioned above, noise, vibration and the like of the steam flow passing the steam path defined by the valve body and the valve seat can be preferably prevented from causing and the stable steam flow around the valve body can be ensured and maintained.

The nature and further characteristic features of the present invention will be made more clear from the following descriptions made with reference to the accompanying drawings.

DESCRIPTION OF THE PREFERRED EMBODIMENTS

Steam valves according to embodiments of the present invention will be described hereunder with reference to the drawings and reference numerals added thereon.

Before the description, a power-generating facility to which a steam valve of the present invention is applicable, and the behavior of steam flow during the opening and closing process in a steam valve of the present invention will be described for better understanding of the steam valve of the present invention.

Figure 11:
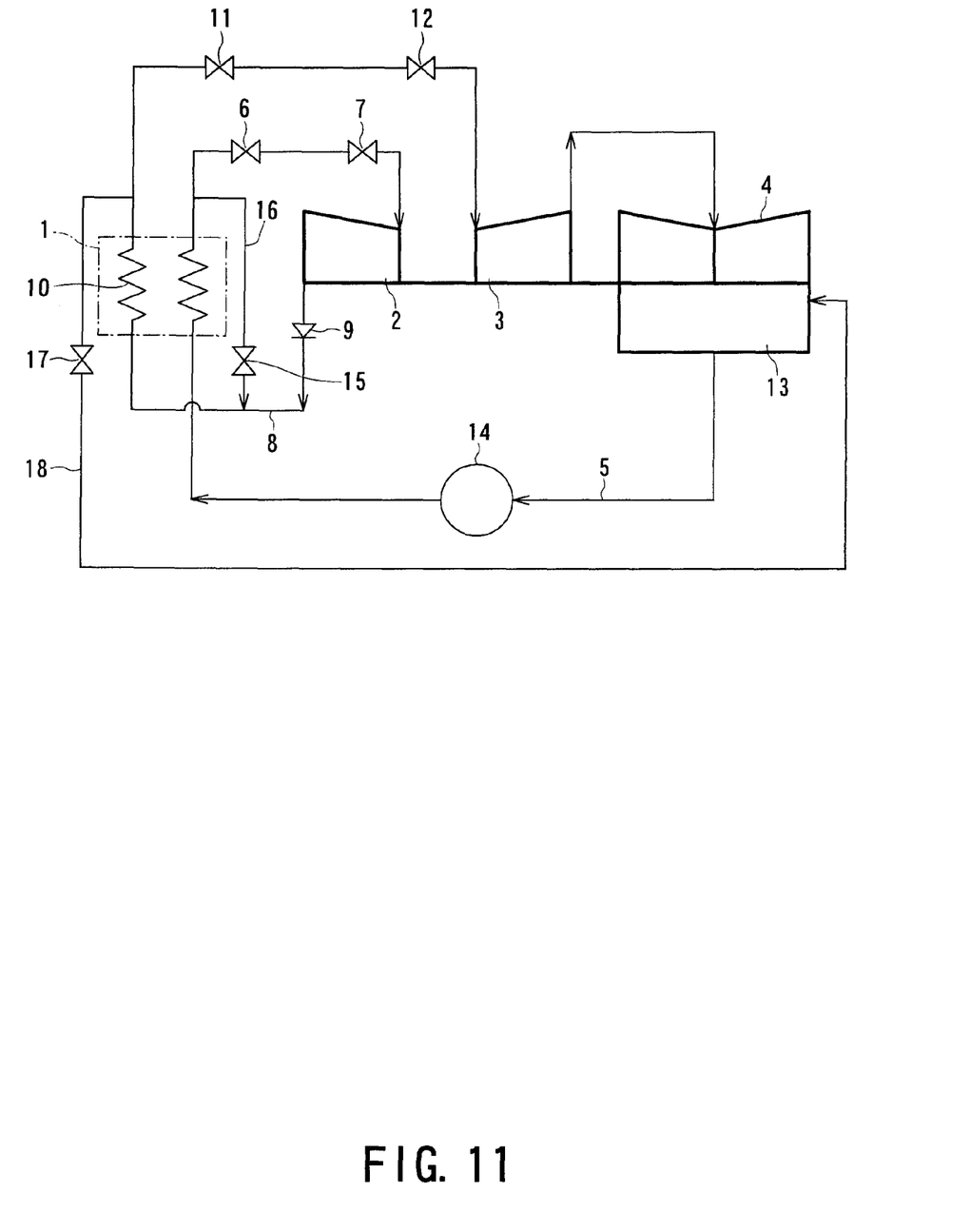
FIG. 11 is a schematic diagram of a thermal power plant.

FIG. 11 is a schematic diagram of a power-generating facility, e.g., a power plant, in which a steam valve of the present invention is used.

This power-generating facility includes a boiler 1, a high-pressure turbine 2, an intermediate-pressure turbine 3, a low-pressure turbine 4, and a condensate/feedwater system 5. The power-generating facility allows steam generated in the boiler 1 to pass through a main steam-stop valve (main stop valve) 6 and a steam governing valve (steam control valve) 7, causes the high-pressure turbine 2 to perform expansion work, and supplies exhaust steam from the high-pressure turbine 2 to a reheater 10 of the boiler 1 via a check valve 9 of a low temperature reheat pipe 8.

The reheater 10 reheats the exhaust steam supplied from the high-pressure turbine 2 via the low temperature reheat pipe 8. The reheater 10 heats the exhaust steam into reheat steam of ultra-supercritical pressure, supplies the reheat steam, via a reheat-steam stop valve 11 and an intercept valve 12, to the intermediate-pressure turbine 3 that performs expansion work. The steam exhausted from the intermediate pressure turbine 3 is further supplied to the low-pressure turbine 4 that also performs expansion work. The steam exhausted from the low pressure turbine 4 is introduced to a condenser 13 of the condensate/feedwater system 5. The condenser 13 condensates the exhaust steam into condensate.

The condensate condensed in the condenser 13 is pressurized by a feedwater pump 14 of the condensate/feedwater system 5 and sent back as feedwater to the boiler 1.

This power plant includes a high-pressure-turbine bypass pipe 16 branching off from the exit of the boiler 1 and connected via a high-pressure-turbine bypass valve 15 to the low temperature reheat pipe 8, and also includes a low-pressure-turbine bypass pipe 18 branching off from the exit of the reheater 10 and connected via a low-pressure-turbine bypass valve 17 to the condenser 13. This configuration enables the boiler 1 to operate independently during the start-up operation of the high-pressure turbine 2, intermediate-pressure turbine 3, and low-pressure turbine 4, thereby enhancing the operability of the plant.

Figure 5:
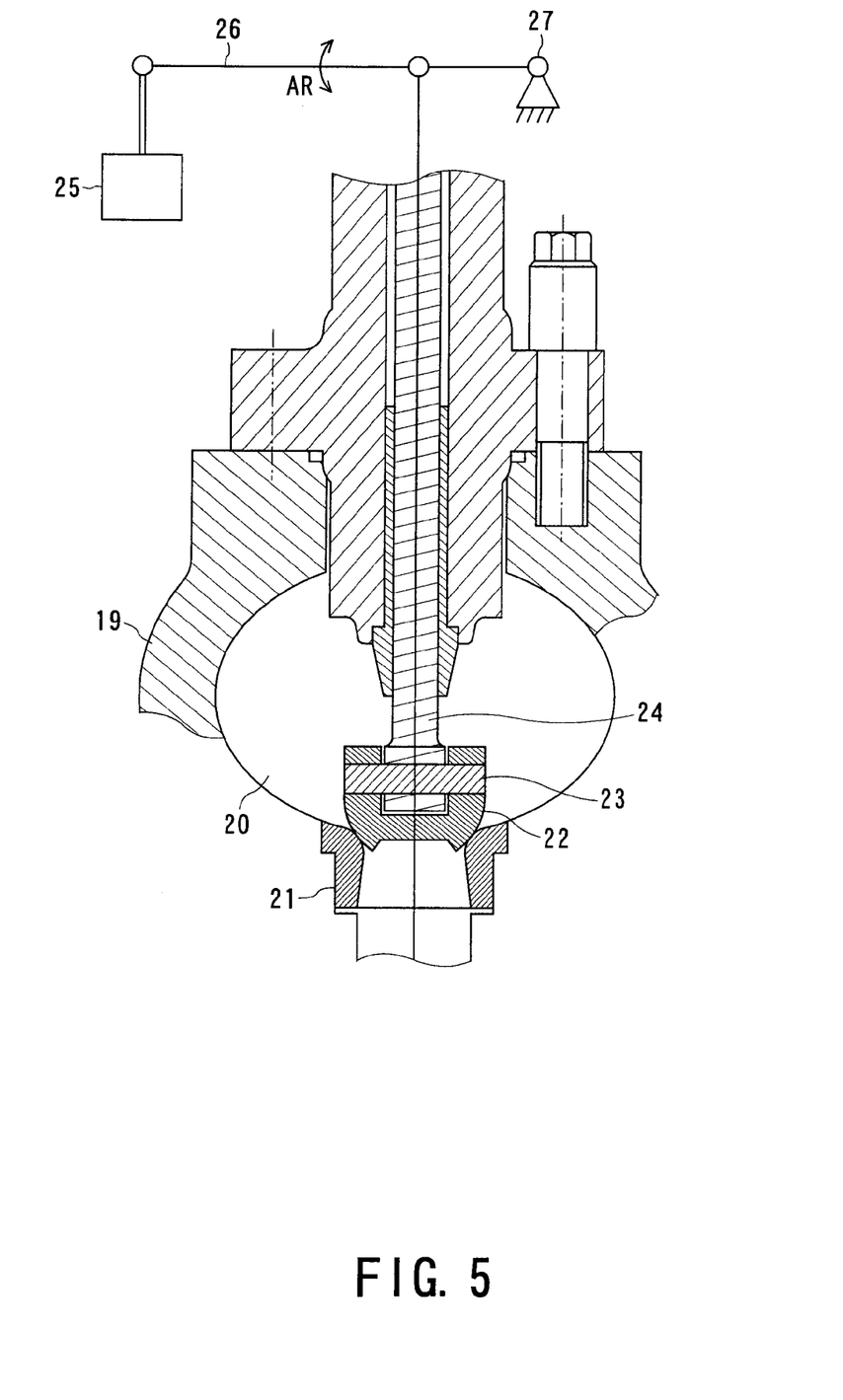
FIG. 5 is a schematic diagram of a first combined-type steam valve in which a valve body is connected to a valve rod via a pin, i.e., pin connection.
Figure 6:
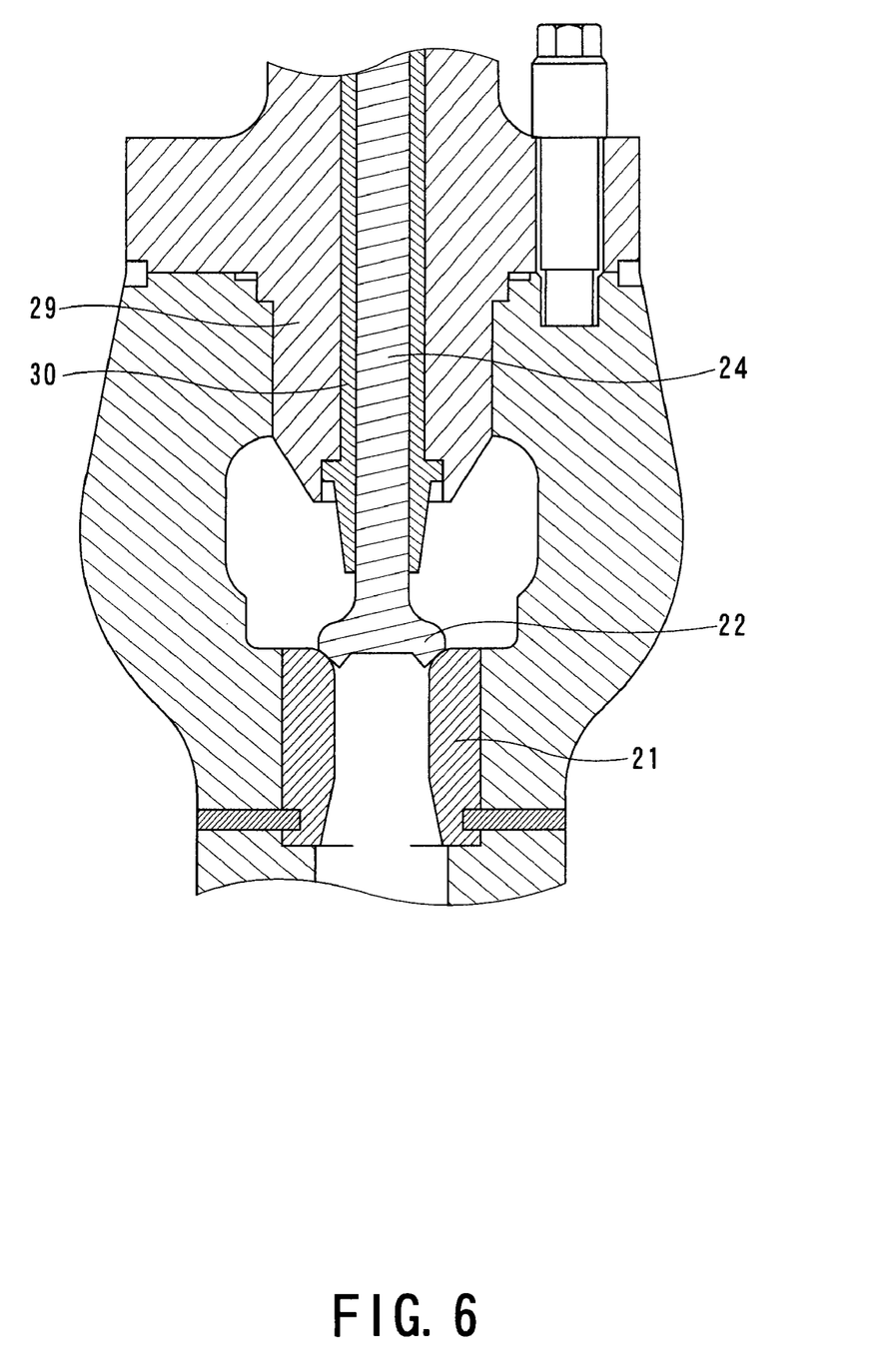
FIG. 6 is a schematic diagram of a second combined-type steam valve in which a valve body and a valve rod are cut out of the same piece of raw material.
Figure 7:
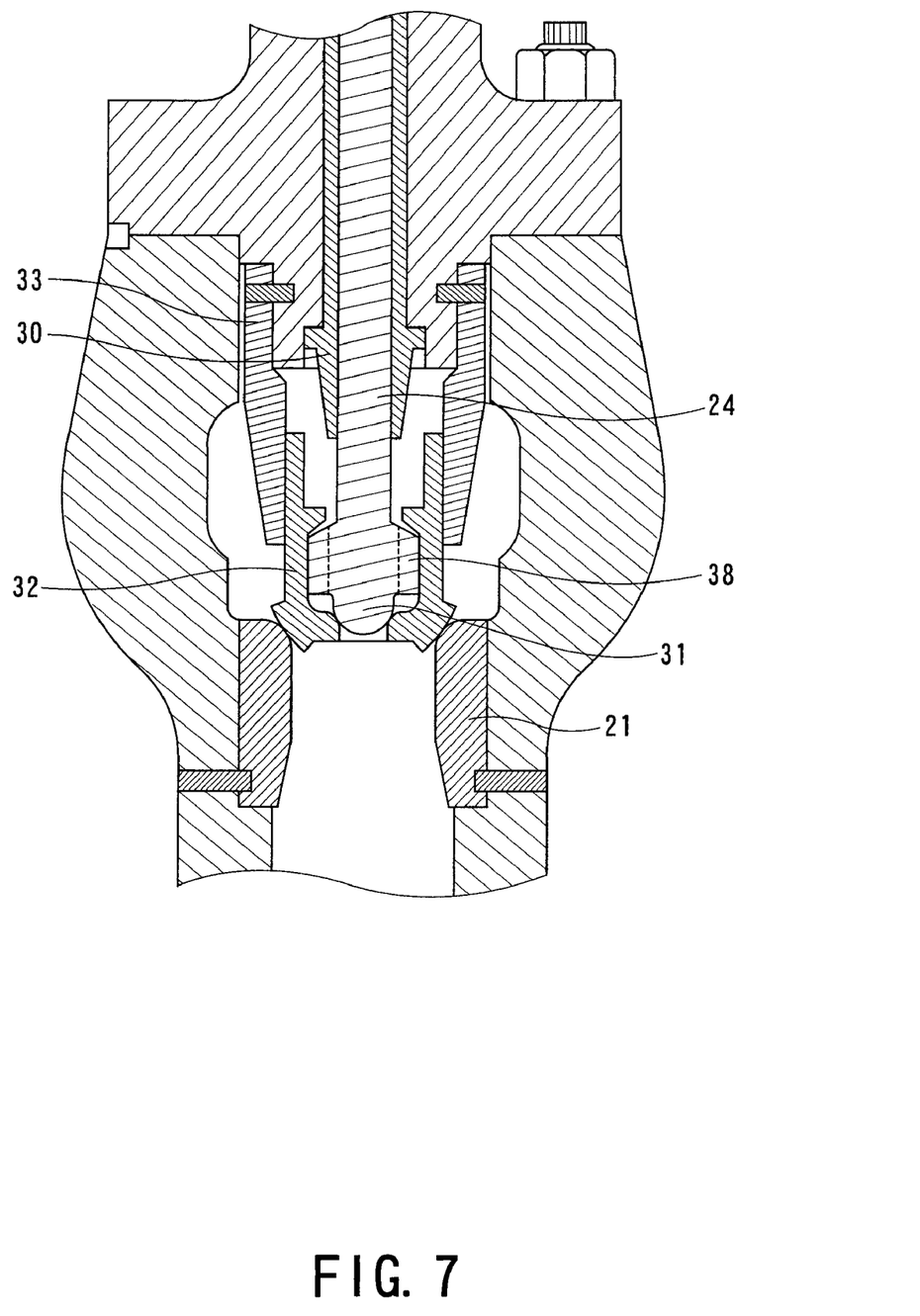
FIG. 7 is a schematic diagram of a separate-type steam valve in which the valve body and the valve rod are separated.

Three configurations of typical steam valves are shown in FIGS. 5 to 7. The steam valves 7, such as the main stop valve 6 and the steam control valve 7, can be selected and applied to from these types. The three types are as follows: a first combined type (a valve 5 body is connected to a valve rod via a pin) shown in FIG. 5; a second combined type (a valve body and a valve rod are cut out of the same piece of raw material) shown in FIG. 6; and a separate type (a valve body and a valve rod are separated (double valve type)) shown in FIG. 7.

FIG. 5 shows the first combined-type steam valve in which a valve chest 20 housed in a valve casing 19 is provided with a valve seat 21 on which a spherical valve body 22 that can move into and out of contact with the valve seat 21 is placed.

The spherical valve body 22 is connected via a pin 23 to a valve rod 24, which is further connected via a lever 26 to an oil cylinder 25. Supplying and draining hydraulic fluid to and from the oil cylinder 25 drives the lever 26 to be swung in the direction indicated by an arrow AR with a supporting point 27 as the fulcrum. The driving force transmitted to the valve rod 24 causes the valve body 22 to move into and out of contact with the valve seat 21 (open and close with respect to the valve seat 21), thereby controlling the amount of steam passing through the valve chest 20.

FIG. 6 shows the second combined-type steam valve that includes the valve body 22 and valve rod 24 cut out of the same piece of material. Sliding the valve rod 24 against a bushing 30 mounted inside a stand 29 allows the valve body 22 to move into and out of contact with the valve seat 21 (open and close with respect to the valve seat 21).

FIG. 7 shows the separate-type (double valve type) steam valve in which the valve rod 24 and auxiliary valve body 31 cut out of the same piece of raw material are housed in a main valve body 32. Upon operation-start, the steam valve causes the valve rod 24 to slide against the bushing 30 to open the auxiliary valve body 31, thereby allowing steam to be supplied from a gap between a balance chamber 33 and the main valve body 32. Then, the steam valve brings a shoulder 38 of the auxiliary valve body 31 into contact with the main valve body 32, allows the main valve body 32 to slide within the balance chamber 33, and causes the main valve body 32 to move into and out of contact with the valve seat 21 (open and close with respect to the valve seat 21).

To achieve a higher level of ultra-supercritical pressure, the present inventors modeled a steam valve having the characteristics of one of the above-described types and carried out experiments over and over again, based on data obtained from Japanese Unexamined Patent Publication No. SHO 56-109955.

Observations and measurements of the behavior and pressure distribution of steam flowing through a steam path defined by the valve seat 21 and the valve body 22 (main valve body 32) showed that unsteady shock waves accompanied by large pressure fluctuations causing vibration to the valve body 22 and the like were generated in steam flowing through the steam path.

Since a steady flow of steam can be ensured by preventing such unsteady shock waves, the present inventors changed the position and size of an edge of a recessed part, e.g., a depression or a hollow, in the valve body 22 (including the main valve body 32) over and over again, through a trial and error process, to develop measures to prevent unsteady shock waves.

Based on the experiments and analysis outlined above, the behavior and pressure distribution of the steam flowing through a steam path between the valve seat 21 and the valve body 22 will be described hereunder in detail with reference to FIG. 1 and FIG. 2.

Figure 1:
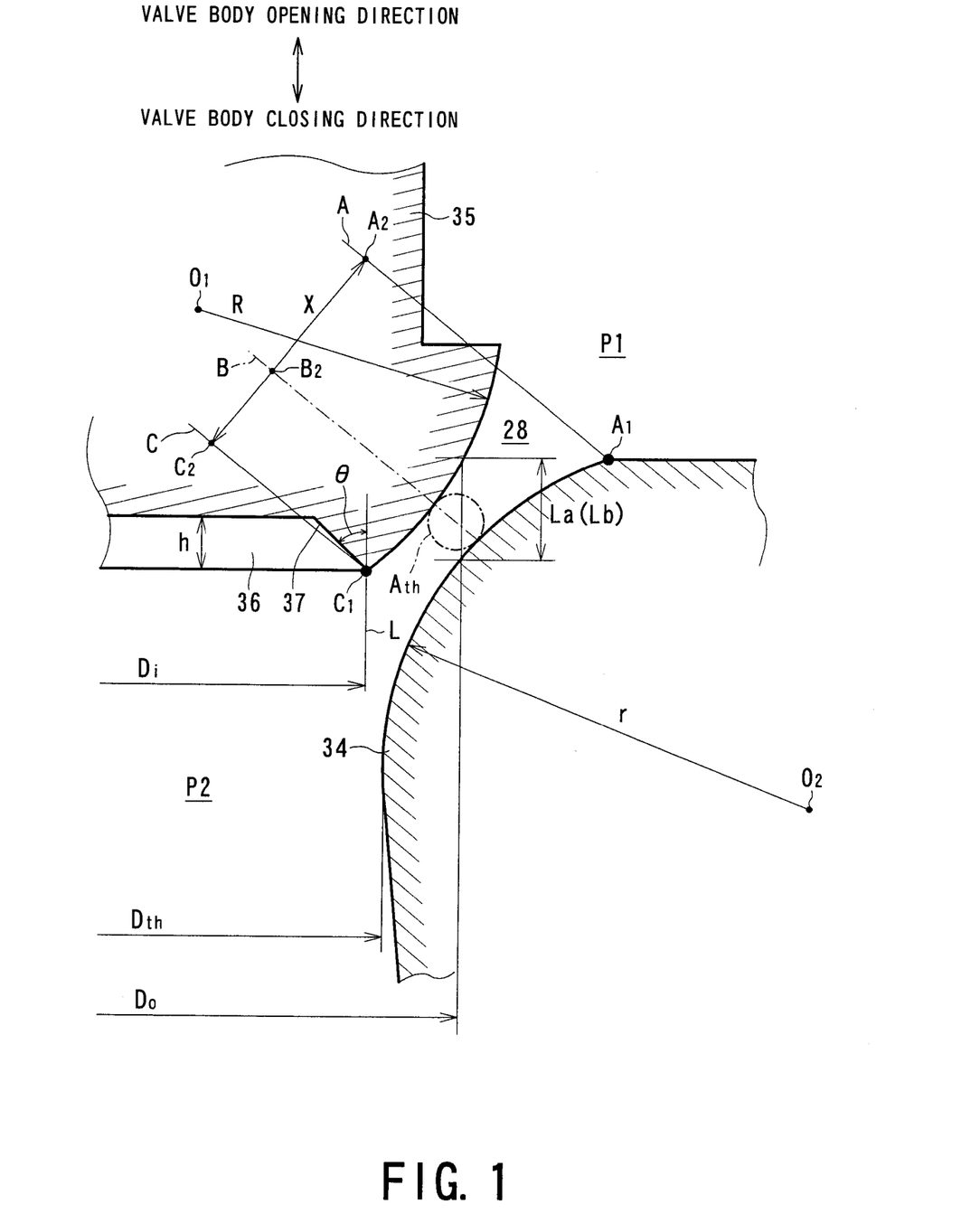
FIG. 1 is a schematic diagram of a steam valve according to a first embodiment of the present invention.

FIG. 1 is a schematic diagram showing the position and degree of a gap between a valve body and a valve seat at a given point at an optional time during the process of valve opening or closing in a steam valve according to the first embodiment of the present invention.

The steam valve includes a valve seat 34 and a spherical valve body 35 (including main valve body). The valve body 35 is provided with a recessed part (e.g., a depression or a hollow) 36 cut and inwardly recessed from the bottom. An edge 37 of the recessed part 36 cuts off steam flowing along the spherical surface of the valve body 35.

A major axis line B connects the center $O_1$ of the curvature radius R of the surface of the valve body 35 with the center $O_2$ of the curvature radius r of the surface of the valve seat 34. A line A is a line parallel with the major axis line B and passes through a position $A_1$ on the surface of the valve seat 34 indicating the starting point of a steam path 28. A line C is a line parallel with the major axis line B and passes through a position $C_1$ on the edge 37 of the recessed part 36 in the valve body 35. The line C passing through the position $C_1$ has a distance X from the line A passing through the position $A_1$. A circle on the major axis line B indicates the minimum path area Ath of the steam path 28 at a certain position and degree of a gap between the valve body 35 and the valve seat 34 at a given point at an optional time.

The recessed part 36 at the bottom of the valve body 35 has a depth (height) h. The edge 37 tilts toward the inside of the valve body 35 at a tilt (tilting) angle θ with respect to an axis line L in the longitudinal direction of the valve body 35 passing through the position $C_1$ of the edge 37.

The edge 37 has a diameter Di. The valve seat 34 coming into contact with the valve body 35 at valve closing has a valve seat diameter Do. The valve seat 34 has a valve-seat internal diameter Dth touching the curvature radius r.

Entrance-side pressure at the front (upstream side) of the valve body 35 is indicated by a character $P_1$, while exit-side pressure at the rear (downstream side) of the valve body 35 is indicated by a character $P_2$. The lift (moving distance) of the valve body 35 at a given point at an optional time is indicated by La (Lb).

Figure 2:
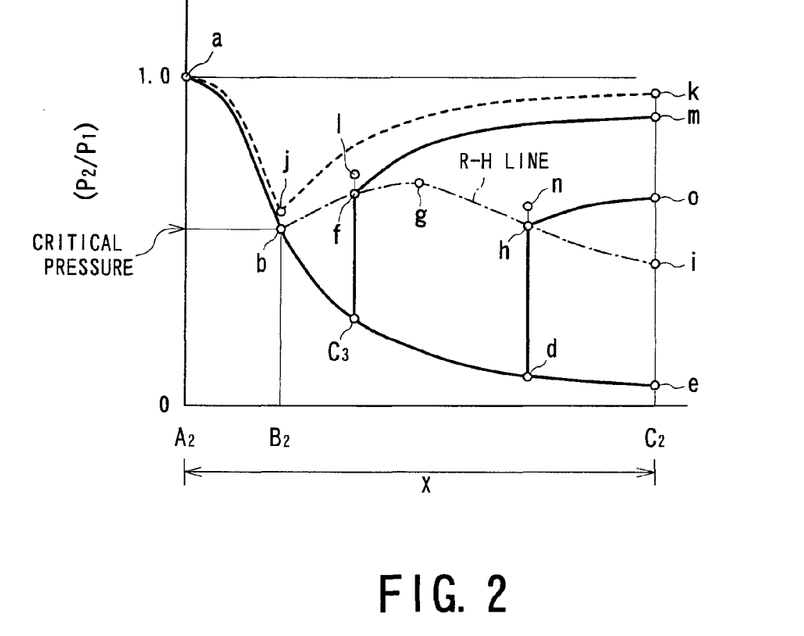
FIG. 2 is a pressure distribution diagram showing the pressure distribution of steam that flows through a steam path defined by a valve body and a valve seat.

FIG. 2 is a pressure distribution diagram of an isentropic flow under ideal conditions, which analogize the steam path 28 at a given point at an optional time shown in FIG. 1 with a de Laval nozzle. The vertical axis represents the ratio of the exit-side pressure $P_2$ of the valve body 35 to the entrance-side pressure $P_1$ of the valve body 35 ($P_2/P_1$), while the horizontal axis represents the distance X shown in FIG. 1.

Identifiers $A_2$, $B_2$, and $C_2$ on the horizontal axis (distance line X) correspond to positions $A_2$, $B_2$, and $C_2$, respectively, shown in FIG. 1.

Assuming that the exit-side pressure $P_2$ is lowered with the entrance-side pressure $P_1$, which is kept constant, the pressure distribution follows a curve starting at a point a (($P_2/P_1$) =1.0) and passing through a point j and a point k, as indicated by a dashed line in FIG. 2. A steam flow having pressure distribution that follows a curve passing through the point a, the point j, and the point k is a subcritical flow (subsonic flow).

When the exit-side pressure $P_2$ is lowered further, the pressure distribution follows a curve indicated by a solid line, and a critical point b is reached in the minimum path area Ath of the steam path 28 on the major axis line B in FIG. 1. A steam flow having pressure distribution that follows a curve from the point a to the critical point b is also a subcritical flow (subsonic flow).

When the exit-side pressure $P_2$ is lowered further, the pressure distribution follows a curve starting at the critical point b and passing through a point $C_3$, a point d, and a point e. A steam flow having pressure distribution that follows a curve from the critical point b to the point e is a supercritical flow (supersonic flow).

When a steam flow is a supercritical flow, a shock wave is generated, for example, at the point $C_3$ and at the point d, in a direction perpendicular to the steam flow, and the pressure rises to a point f and to a point h, respectively (recovery of static pressure). The pressure distribution follows a Rankine-Hugoniot (R-H) line starting at the critical point b and passing through the point f, a point g (maximum pressure), the point h, and a point i, indicated by a chain line.

The steam flow exhibiting a pressure rise to the point f and point h on the R-H line exhibits a further pressure rise from the point f to a point m, and from the point h to a point o, producing subcritical flows (subsonic flows).

The pressure distribution diagram in FIG. 2 shows an ideal pressure distribution of an isentropic flow.

In practice, however, observations showed that, for example, shock waves generated at the point $C_3$ and point d caused pressure to exceed the point f and point h on the R-H line and to reach a point l and point n, respectively.

Figure 3:
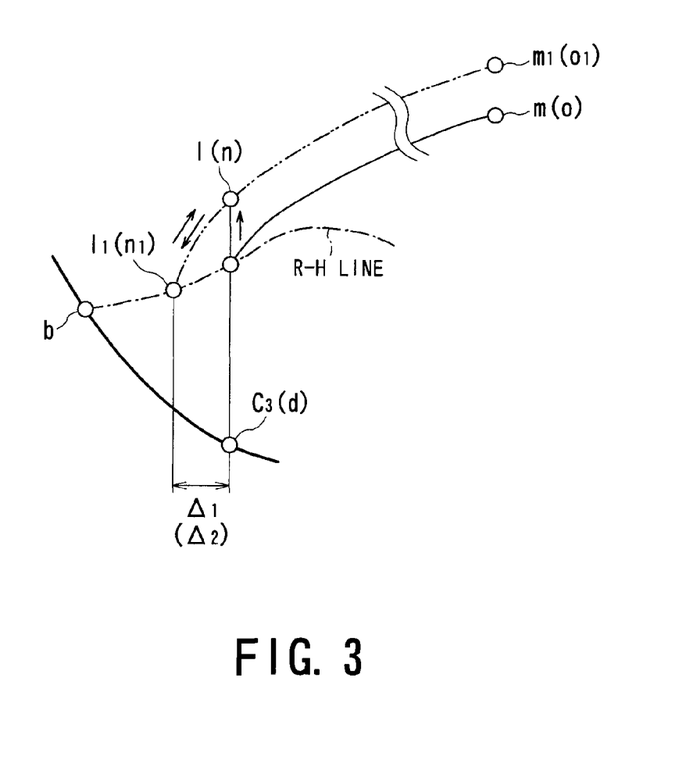
FIG. 3 is a partial enlarged view of FIG. 2.

The steam flow exhibiting a pressure rise to the point 1 and point n due to the shock waves is in an unstable state and cannot independently maintain its steady state. Therefore, as shown in FIG. 3, the point l and the point n are shifted to a point $l_1$ and a point $n_1$, respectively, on an upper stream side of the R-H line. The steady state of the steam flow can thus be maintained. Then, the steam flow exhibiting a pressure rise to the point l and point n due to shock waves becomes artificially a subcritical flow that follows a curve starting at the point $l_1$ and the point $n_1$ on the R-H line toward a point $m_1$ and a point $o_1$, respectively.

Thus, in an area $\Delta_1$ where a shift from the point l to the point $l_1$ occurs, and in an area $\Delta_2$ where a shift from the point n to the point $n_1$ occurs, pressure fluctuations cause noise and vibration in a steam flow. Moreover, a shift caused by a shock wave continuously occurs toward the upstream side of the R-H line up to the critical point b.

That is, the present inventors found from the observations that a shock wave was generated many times in a range from the critical point b to the point e, every time when the shock wave caused pressure to rise beyond the R-H line and then shift toward the upstream side of the R-H line, and such a shift occurred sequentially up to the critical point b. The critical point b corresponds to the minimum path area Ath in the steam path 28 shown in FIG. 1.

Based on the data and knowledge (information) described above, the present inventors focused their attention on the fact that a steam flow from the entrance side to the minimum path area Ath in the steam path 28 between the valve body 35 and the valve seat 34 was a subcritical flow (subsonic flow), and that no shock wave was generated in that range. The present inventors thus reached the completion of the embodiment of the present invention described below.

In the present embodiment, the edge 37 of the recessed part 36 provided on the bottom of the valve body 35 is positioned on the upstream side of the steam path 28 and immediately before the place where a shock wave is generated in the steam path 28.

In the steam valve, typically noise and vibration are generated in certain range of the valve lift. Therefore, the position of the edge 37 might be preferably determined based on the place where a shock wave is generated when the valve lift is in the range that generates noise or vibration. Experiments or computer simulations may be determine the valve lift (and the place where the shock wave is generated) that generates noise or vibration in its steam path 28.

The dimensions of the valve body 35 and the valve seat 34 are set to $Di \geq 0.90\ Do$ $Dth \geq 0.80\ Do$ where Di is the diameter of the edge 37, Dth is a valve-seat internal diameter touching the curvature radius r of the valve seat 34, and Do is the valve seat diameter of the valve seat 34 coming into contact with the valve body 35 at the valve closing time.

While the values described above are within an applicable range confirmed by experiments, it is more preferable that the edge diameter Di and the valve-seat internal diameter Dth be set to $Di = (0.90\ \text{to}\ 1.0)Do$ $Dth = (0.80\ \text{to}\ 0.90)Do.$ If the edge diameter Di and the valve-seat internal diameter Dth are set to be within the range described above, the minimum path area Ath of the steam path 28 can be set to have any shape different from that of the geometric minimum path area formed on the major axis line B connecting the center $C_1$ of the curvature radius R of the valve body 35 with the center $C_2$ of the curvature radius r of the valve seat 34.

In this case, the curvature radius R of the valve body 35 and the curvature radius r of the valve seat 34 are set to one of $R = (0.52\ \text{to}\ 0.6)Do,\ r \geq 0.6\ Do;$ $R = (0.6\ \text{to}\ 0.85)Do,\ r = (0.45\ \text{to}\ 0.6)Do;$ and $R = r = (0.45\ \text{to}\ 0.85)Do,$ where Do is the seat diameter of the valve seat 34.

The edge diameter Di and the valve-seat internal diameter Dth are both appropriate values ascertained by experiments.

The tilt angle θ of a surface tilted from the edge 37 of the recessed part 36 at the bottom of the valve body 35 toward the inside of the valve body 35 is set to θ=45° with respect to the axis line L that passes through the edge 37 and serves as a reference line for the edge diameter Di.

The depth (height) h of the recessed part 36 is set to $h \leq 15$ mm regardless of the valve seat diameter Do at the contact point between the valve body 35 and the valve seat 34.

In the steam valve of the present embodiment, considerations need to be given to noise and vibration during the process of opening the valve body, as well as to those associated with shock waves described above.

In a known steam valve, a pressure difference between the entrance side and exit side of a valve body decreases as the valve body moves toward the full open position. Then, drift and turbulent steam flowing through the steam path 28 directly cause the valve body 35 to float toward the full open position. This occurs repeatedly and causes noise and vibration during the opening process. Such a problem is more serious in the separate-type steam valve shown in FIG. 7 than in the combined-type steam valves shown in FIG. 5 and FIG. 6.

The present embodiment takes such circumstances into consideration, and places a limit on the lift (stroke) of the valve body 35 so that thrust is always added to the valve-plug entrance-side pressure $P_1$ even if the difference between the valve-plug entrance-side pressure $P_1$ and the valve-plug exit-side pressure $P_2$ decreases as the valve body 35 approaches the full open position.

In the present embodiment, the range of a maximum lift (stroke) La when the valve body 35 of each of the combined-type steam valves shown in FIG. 5 and FIG. 6 is at the full-opening position is set to $La = (0.25\ \text{to}\ 0.35)Do,$ while the range of a maximum lift (stroke) Lb when the valve body 35 of the separate-type steam valve shown in FIG. 7 is at the full-opening position is set to $Lb \leq 0.25\ Do$ where Do is a valve seat diameter.

The above-described range of the maximum lift La for the combined-type steam valves and the maximum lift Lb for the separate-type steam valve are both the applicable ranges ascertained by experiments.

In the steam valve of the present embodiment, the edge 37 of the recessed part 36 provided on the bottom of the valve body 35 is positioned on the upstream side of and immediately before the place where a shock wave is generated in the steam path 28. Moreover, the edge diameter Di and the valve-seat internal diameter Dth are set to be within a desirable numerical range ascertained by experiments, while the dimensions of the curvature radius R of the valve body 35 and the curvature radius r of the valve seat 34 are also set to be appropriate values ascertained by experiments. Thus, noise and vibration of steam flow passing through the steam path 28 can be prevented, and steady steam flow around the valve body 35 can be reliably ensured and maintained.

Moreover, in the steam valve of the present embodiment, the tilt angle θ of a surface tilted from the edge 37 of the recessed part 36 at the bottom of the valve body 35 toward the inside of the valve body 35 is set to θ=45° with respect to the axis line L that passes through the edge 37 and serves as a reference line for the edge diameter Di. This prevents steam from entering the recessed part 36 via the edge 37 and thus can prevent erosion caused by stagnant steam in the recessed part 36.

Moreover, in the steam valve of the present embodiment, the range of the depth h of the recessed part 36 provided at the bottom of the spherical valve body 35 is set to h≦15 mm such that excitation force generated by frequent jet flow from the steam path 28 to the recessed part 36 can be weakened. The occurrence of cracks and the like in the edge 37 can thus be prevented.

Moreover, in the steam valve of the present embodiment, different ranges of valve lift are set for the above-described combined types and separate type such that noise and vibration generated in the process of fully opening the valve body can be reduced. Thus, steady steam flow around the valve body 35 can be reliably ensured and maintained.

Figure 4:
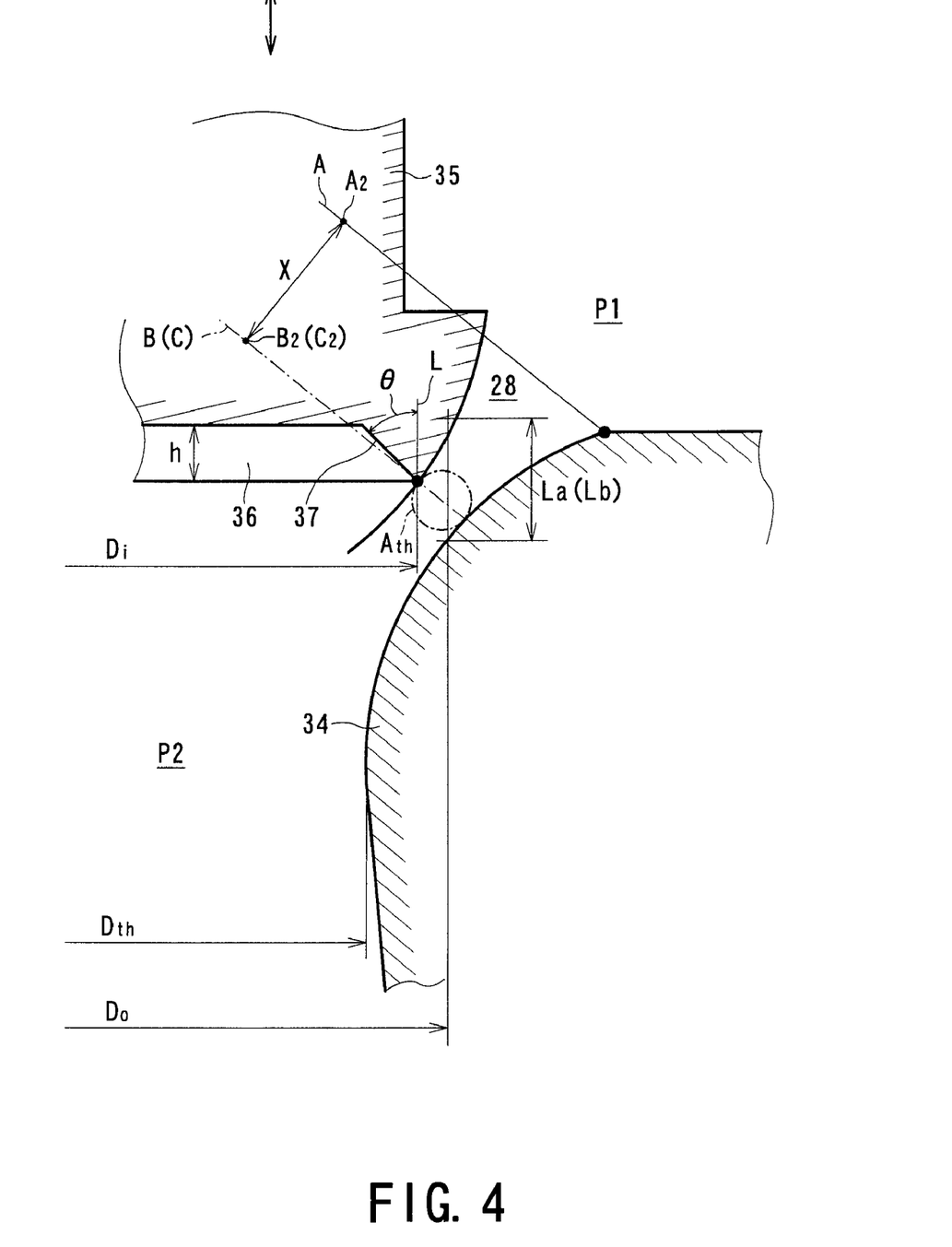
FIG. 4 is a schematic diagram of a steam valve according to a second embodiment of the present invention.

FIG. 4 is a schematic diagram of a steam valve according to the second embodiment of the present invention. In the drawing, components that are identical to those in the first embodiment are given the same reference numerals.

In the steam valve of the present embodiment, the edge 37 of the recessed part 36 provided on the bottom of the valve body 35 is positioned at the critical point of steam, that is, in the minimum path area Ath (major axis line B (C) connecting the center of the curvature radius R of the valve body 35 with the center of the curvature radius r of the valve seat 34) of the steam path 28 at a valve lift position where noise and vibration start to be generated within the range of valve lift. The positioning of the edge 37 is based on the valve lift position where noise and vibration start to be generated because the minimum path area Ath of the steam path 28 changes (varies) depending on the valve lift position. This embodiment might be achieved by forming the edge 37 to contact with the valve seat 34 when the valve body 35 is completely closed with respect to the valve seat 34.

Further, since the valve lift tends to almost be fixed during the rated operation of the steam turbine, the position of the edge 37 may be based on the valve lift under the rated operation. This might be able to reduce noise and vibration of the steam valve when noise or vibration is relatively large during the rated operation. As described above, in the steam valve of the present embodiment, the edge 37 of the recessed part 36 provided on the bottom of the valve body 35 is positioned, as is also shown in FIG. 2, at the critical point b where no shock wave is generated. Thus, noise and vibration of steam flow passing through the steam path 28 can be prevented, and steady steam flow around the valve body 35 can be reliably ensured and maintained.

In the steam valve, typically, noise and vibration are generated in certain range of the valve lift. Therefore, the position of the edge 37 might be preferably determined based on the critical point b (minimum path area Ath of the steam path 28) of certain valve lift that generates noise or vibration in its steam path 28. Experiments or computer simulations may determine the valve lift, which generates noise or vibration in its steam path 28.

Figure 8:
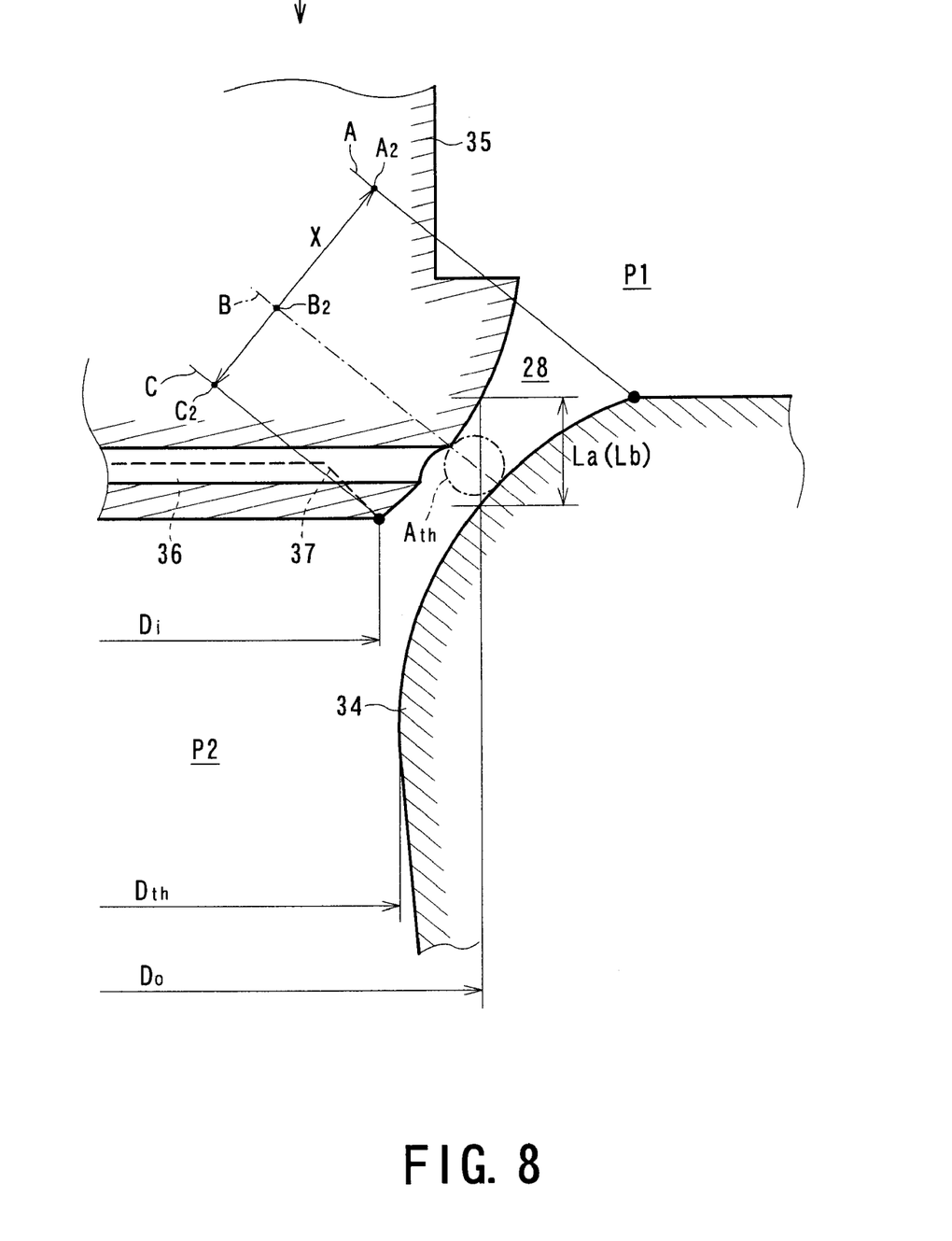
FIG. 8 is a schematic diagram of a steam valve according to a third embodiment of the present invention.

FIG. 8 is a schematic diagram of a steam valve according to the third embodiment of the present invention. In the drawing, components that are identical to those in the first embodiment are given the same reference numerals.

The steam valve of the present embodiment is provided with at least one annular groove 39 having semicircular cross-section with a radius of preferably 1 mm or less around the valve body 35 in the circumferential direction. The annular groove 39 is preferably located on the downstream side of the major axis line B (minimum path area Ath of the steam path 28) at the condition that starts to generate the supercritical (supersonic) stream flow in the steam path 28. As described above, since the major axis line B connects the center of the curvature of the valve body 35 and the center of the curvature of the valve seat 34, the position of the major axis line B corresponds to the position of minimum path area Ath of the steam path 28 when the supercritical (supersonic) stream flow starts to be generated.

The present embodiment is based on the fact, as shown in FIG. 2 and FIG. 3, that a shock wave generated on the downstream side of the critical point b causes pressure to rise above the R-H line to reach the points l and n, which is then shifted to the upstream side of the R-H line. The groove 39 changes the surface area of the spherical valve body 35, limits the pressure rise associated with shock waves, allows static pressure to recover, and suppresses the shock waves, thereby preventing the pressure rise associated with shock waves from shifting to the upstream side of the R-H line.

As described above, in the present embodiment, the annular groove 39 along the circumferential direction of the valve body 35 is positioned on the downstream side of the major axis line B passing through the center $C_1$ of the curvature of the valve body 35 and the center $C_2$ of the curvature of the valve seat 34. Since this changes the surface area of the valve body 35 and compensates for the pressure rise associated with shock waves, noise and vibration of steam flow passing through the steam path 28 can be prevented, and steady steam flow around the valve body 35 can be reliably ensured and maintained.

Figure 9:
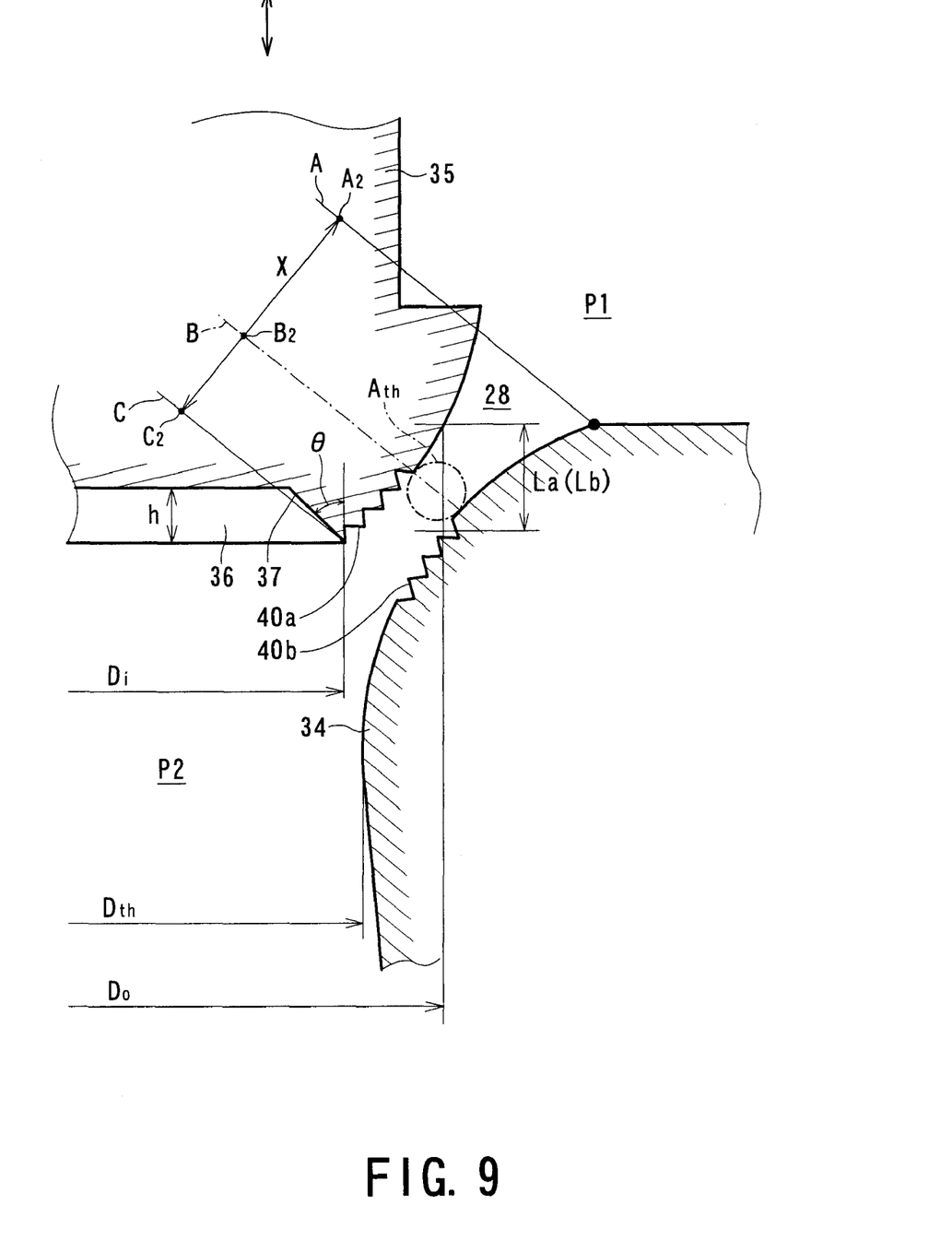
FIG. 9 is a schematic diagram of a steam valve according to a fourth embodiment of the present invention.

In the present embodiment, the annular groove 39 is provided along the circumferential direction of the valve body 35 to change the surface area. As shown in FIG. 9, in the fourth embodiment, at least one of the valve body 35 and the valve seat 34 may be provided with a knurled portion to change the surface area. That is, at least one of a knurled portion (a ridge having an edge) 40a and a knurled portion (a ridge having an edge) 40b may be provided along the entire circumference of one of the valve body 35 and the valve seat 34.

Preferably, in this case, the roughness $R_1$ of the knurled portion 40a of the valve body 35 is 0.8 S, while the roughness $R_2$ of the knurled portion 40b of the valve seat 34 ranges from 1.6 S to 50 S.

Similarly to the third embodiment, the knurled portion 40a and the knurled portion 40b of the valve body 35 and the valve seat 34, respectively, are both positioned on the downstream side of the major axis line B passing through the center of the valve body 35 and the center of the valve seat 34.

Figure 10:
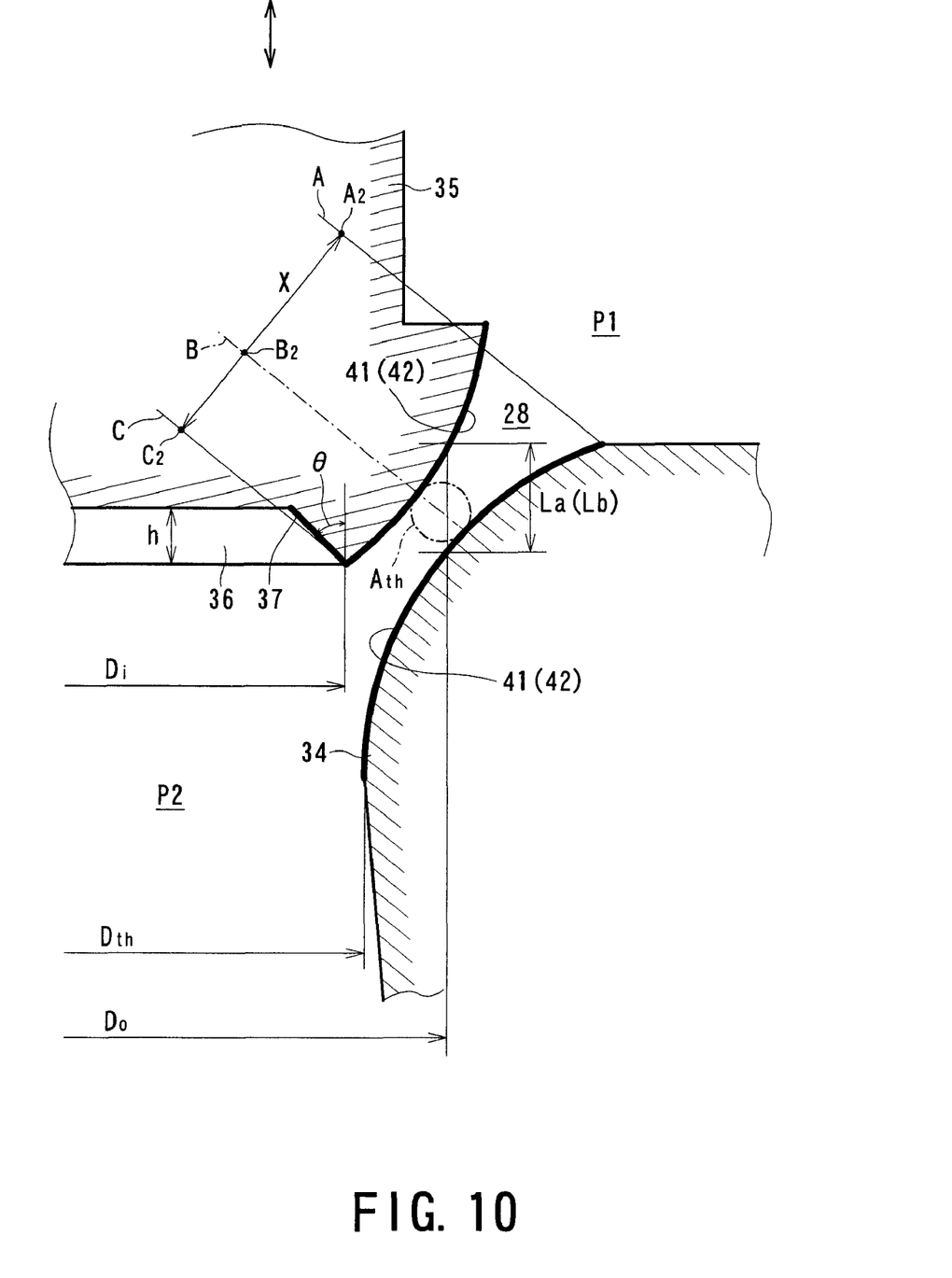
FIG. 10 is a schematic diagram of a steam valve according to a fifth embodiment of the present invention.

FIG. 10 is a schematic diagram of a steam valve according to the fifth embodiment of the present invention. In the drawing, components that are identical to those in the first embodiment are given the same reference numerals.

To prevent the valve body 35, the recessed part 36, the edge 37, and the valve seat 34 from being damaged due to oxide scales (iron powder) in steam passing through the steam path 28 between the valve body 35 and the valve seat 34, the steam valve of the present embodiment is provided with a hardened heat-treated portion 41 formed by nitriding treatment or a hard-alloy-surfaced portion 42 treated with Stellite (trade name) containing cobalt.

In the thermal power plant in which the ultra-supercritical pressure technology is introduced, an increase in the use of austenitic material causes a larger amount of oxide scale to be generated. Therefore, the application of hardening means, such as those described above, is extremely effective in preventing the valve body 35, the recessed part 36, the edge 37, and the valve seat 34 from being damaged.

What is claimed is:

1. A steam valve comprising:
   a valve body;
   a valve seat; and
   a valve rod provided for the valve body,
   the valve body having a bottom portion to which a recessed portion is formed, the recessed portion having an edge,
   wherein a range of a curvature radius R of the valve body is set to $R=(0.52 \text{ to } 0.6)Do$ and a range of a curvature radius r of the valve seat is set to $r \geq 0.6 Do$ in which Do is a valve seat diameter of a valve seat, and
   wherein the edge of the recessed portion is positioned on an upstream side of a major axis line connecting the center of the curvature radius of the valve body with the center of the curvature radius of the valve seat so that the edge forms the minimum path area of a steam path between the valve body and the valve seat, in which a range of a maximum valve lift La of the valve body combined with the valve rod is set to $La=(0.25 \text{ to } 0.35)Do.$ 2. The steam valve according to claim 1, wherein a range of an edge diameter Di of the edge is set to $Di \geq 0.90 Do$ and a range of a valve-seat internal diameter Dth of the valve seat is set to $Dth \geq 0.80 Do$ in which Do is the valve seat diameter of the valve seat.

3. The steam valve according to claim 1, wherein a range of an edge diameter Di of the edge is set to $Di=(0.90 \text{ to } 1.0)Do$ and a range of a valve-seat internal diameter Dth of the valve seat is set to $Dth=(0.80 \text{ to } 0.90)Do$ in which Do is the valve seat diameter of the valve seat.

4. The steam valve according to claim 1, wherein a depth h of the recessed portion is set to $h \leq 15$ mm and a tilt angle θ of the edge is set to $\theta=45°$.

5. The steam valve according to claim 1, wherein the range of the curvature radius r of the valve seat is set to $r=(0.6 \text{ to } 0.85)Do$ in which Do is the valve seat diameter of the valve seat.

6. The steam valve according to claim 1, wherein the valve body, the valve seat, and the recessed portion are formed with either one of a hardened heat-treated portion and a hard-alloy-surfaced portion.

7. A steam valve comprising:
   a valve body;
   a valve seat; and
   a valve rod provided for the valve body,
   the valve body having a bottom portion to which a recessed portion is formed, the recessed portion having an edge,
   wherein a range of a curvature radius R of the valve body is set to $R=(0.52 \text{ to } 0.6)Do$ and a range of a curvature radius r of the valve seat is set to $r \geq 0.6 Do$ in which Do is the valve seat diameter of the valve seat,
   wherein a range of a maximum valve lift Lb of the valve body separated from the valve rod is set to $Lb \leq 0.25 Do$ in which the edge of the recessed portion is positioned on an upstream side of a major axis line connecting the center of the curvature radius of the valve body with the center of the curvature radius of the valve seat so that the edge forms the minimum path area of a steam path between the valve body and the valve seat.

8. The steam valve according to claim 7, wherein a range of an edge diameter Di of the edge is set to $Di \geq 0.90 Do$ and a range of a valve-seat internal diameter Dth of the valve seat is set to $Dth \geq 0.80 Do$ in which Do is the valve seat diameter of the valve seat.

9. The steam valve according to claim 7, wherein a range of an edge diameter Di of the edge is set to $Di=(0.90 \text{ to } 1.0)Do$ and a range of a valve-seat internal diameter Dth of the valve seat is set to $Dth=(0.80 \text{ to } 0.90)Do$ in which Do is the valve seat diameter of the valve seat.

10. The steam valve according to claim 7, wherein a depth h of the recessed portion is set to $h \leq 15$ mm and a tilt angle θ of the edge is set to $\theta=45°$.

11. The steam valve according to claim 7, wherein the range of a curvature radius R of the valve body and a curvature radius r of the valve seat is set to $r=(0.6 \text{ to } 0.85)Do$ in which Do is the valve seat diameter of the valve seat.

12. The steam valve according to claim 7, wherein the valve body, the valve seat, and the recessed portion are formed with either one of a hardened heat-treated portion and a hard-alloy-surfaced portion.

* * * * *